United States Patent
Monnier et al.

(10) Patent No.: US 12,486,043 B2
(45) Date of Patent: Dec. 2, 2025

(54) AVIONIC CALCULATOR COMPRISING A MULTICORE PROCESSOR, WITH A FILTERING CORE BETWEEN OPEN AND AVIONIC DOMAINS

(71) Applicant: THALES, Courbevoie (FR)

(72) Inventors: Stéphane Jean-Mary Monnier, Merignac (FR); Alexandre Fine, Merignac (FR)

(73) Assignee: THALES, Courbevoie (FR)

( * ) Notice: Subject to any disclaimer, the term of this patent is extended or adjusted under 35 U.S.C. 154(b) by 217 days.

(21) Appl. No.: 18/454,788

(22) Filed: Aug. 24, 2023

(65) Prior Publication Data
US 2024/0076057 A1   Mar. 7, 2024

(30) Foreign Application Priority Data
Sep. 1, 2022  (FR) .................................... 2208775

(51) Int. Cl.
*B64D 45/00*    (2006.01)
*G08G 5/20*    (2025.01)

(52) U.S. Cl.
CPC ........... *B64D 45/0015* (2013.01); *G08G 5/20* (2025.01)

(58) Field of Classification Search
CPC .............................. B64D 45/0015; G08G 5/20
See application file for complete search history.

(56) References Cited

U.S. PATENT DOCUMENTS

2016/0255572 A1* 9/2016 Kaba .................... H04W 4/025
                                                          455/515
2019/0386958 A1* 12/2019 Leconte ................. G06F 40/30

FOREIGN PATENT DOCUMENTS

EP      3792759 A1    3/2021
FR      3079609 A1    10/2019

OTHER PUBLICATIONS

Farrukh, Anam, et al., "FLYOS: Integrated Modular Avionics for Autonomous Multicopters", 2022 IEEE 28th Real-Time and Embedded Technology and Applications Symposium (RTAS), IEEE, 4 mai 2022 (May 4, 2022), pp. 68-81.

(Continued)

*Primary Examiner* — Peter D Nolan
*Assistant Examiner* — Mikko Okechukwu Obioha
(74) *Attorney, Agent, or Firm* — Soquel Group LLC

(57) ABSTRACT

The avionic calculator is suitable for being carried on-board an aircraft and comprises a multi-core processor configured for executing avionic software applications. The processor includes at least one primary core for communicating with at least one avionic equipment distinct from the calculator, each avionic equipment being carried on-board the aircraft and belonging to an avionic domain; at least one secondary core for communicating with at least one electronic device external to the avionic domain; and a tertiary core for performing at least one filtering of a data message received from a respective device external to the avionic domain and intended for a respective avionic equipment of the avionic domain. Each avionic software application being executable by the at least one primary core or the at least one secondary core.

19 Claims, 2 Drawing Sheets

(56) References Cited

OTHER PUBLICATIONS

Dasgupta, Dipankar, et al., "A conceptual model of self-monitoring multi-core systems", Cyber Security and Information Intelligence Research, ACM, 2 Penn Plaza, Suite 701 New York NY 10121-0701 USA, Apr. 21, 2010 (Apr. 21, 2010), pp. 1-4.
ARINC, "Commercial Aircraft Information Security Concepts of Operation and Process Framework", ARINC Report 811, Dec. 20, 2005, Airlines Electronic Engineering Committee, Aeronautical Radio Inc., 134 pages.
FR 2208775, INPI Rapport de Recherche Preliminaire, May 10, 2023, 2 pages.

* cited by examiner

AVIONIC CALCULATOR COMPRISING A MULTICORE PROCESSOR, WITH A FILTERING CORE BETWEEN OPEN AND AVIONIC DOMAINS

REFERENCE TO RELATED APPLICATION

This application is a U.S. non-provisional application claiming the benefit of French Application No. 22 08775, filed on Sep. 1, 2022, the contents of which are incorporated herein by reference in their entirety.

TECHNICAL FIELD OF THE INVENTION

The present invention relates to an avionic calculator suitable for being carried on-board an aircraft.

The invention relates more particularly to an aircraft, although is applicable to any type of aircraft, such as a helicopter or a drone.

The invention relates more particularly to the field of cyber security in an avionics context.

BACKGROUND OF THE INVENTION

An aircraft conventionally includes avionic equipment for assisting the piloting of the aircraft, such as a Flight Management System (FMS); a Flight Guidance (FG) system; a Flight Control System (FCS); etc. Such avionic systems exchange information with one another by means of a communication network of the aircraft, which are part of a communication system within the aircraft, generally including equipment other than avionic equipment. The communication system comprises in particular equipment implementing functions relating to the airline operating the aircraft, such as a Centralized Maintenance System (CMS); or a passenger cabin management system.

Avionic equipments are grouped in a domain, called avionic domain, to which corresponds a security level which is the highest of the aircraft communication system, so as to ensure that the operation of the functions implemented by the avionic equipment is not likely to be disrupted by communications with equipment outside the avionic domain. The security level required for other equipment is lower than the security level required for the avionic domain.

The communication system is e.g. as per the standard ARINC 811 which defines different domains having different security levels in an aircraft communication system, in particular: an ACD (Aircraft Control Domain) corresponding to the aforementioned avionic domain; an AISD (Airline Information Services Domain) comprising equipment implementing airline functions (maintenance, cabin management, etc.); and a PIESD (Passenger Information and Entertainment Services Domain) relating to entertainment and passenger information.

As per the standard ARINC 811, the security level of the ACD corresponds to the highest level of security of the aircraft communication system because the functions implemented by the equipment of the ACD could be essential for controlling the flight of the aircraft. The security level of the AISD is lower than the security level of the ACD, the functions implemented in the AISD being less essential, at least in the short term, for the control of the flight of the aircraft. The security level of the PIESD is lower than the security level of the AISD.

The exchange of information from a domain with a lower security level to a domain with a higher security level is very strongly restricted so as not to compromise the security of the domain with the higher security level. More particularly, the transfer of information from a domain, called an open domain and corresponding to the outside of the ACD, to the ACD, is strongly restricted so as not to compromise the security of the ACD.

In order to meet such need for a security gateway between the open domain and the avionic domain with a higher security level, it is known from the document FR 3 079 609 B1 how to implement such security gateway via a dedicated calculator proposing a unidirectional outgoing data solution.

However, such a security gateway is not optimal.

SUMMARY OF THE INVENTION

The goal of the invention is then to propose an avionic calculator used for responding more effectively to the need for a security gateway between the open domain and the avionic domain.

To this end, the subject matter of the invention is an avionic calculator intended for being carried on-board an aircraft, the calculator comprising a multicore processor configured for executing one or a plurality of avionic software applications, the processor comprising:
- at least one primary core configured for communicating with at least one avionic equipment distinct from the calculator, the or each avionic equipment being carried on-board the aircraft and belonging to an avionic domain,
- at least one secondary core configured for communicating with at least one electronic device external to the avionic domain, the at least one secondary core being distinct from the at least one primary core, and
- a tertiary core configured for performing at least one filtering of a data message received from a respective device external to the avionic domain and intended for a respective avionic equipment of the avionic domain, the tertiary core being distinct from the at least one primary core and the at least one secondary core;
- each avionic software application being executable by a respective core chosen among the at least one primary core and the at least one secondary core.

With the avionic calculator according to the invention, the at least one primary core is suitable for communicating with the avionic domain, the secondary core is suitable for communicating with the open domain, and the tertiary core then forms, by means of the at least one filtering performed, a security barrier between the open domain and the avionic domain.

From a cyber-security point of view, the secondary core and the tertiary core then belong to an area exposed to the open domain, more particularly for the secondary core in communication with the open domain; the at least one primary core belongs to a trusted zone protected by the security barrier formed by the tertiary core.

In addition to the function of security gateway, the avionic calculator is configured for executing one or a plurality of software applications, and then fulfills a dual function.

A skilled person would further notice that the calculator according to the invention then provides a spatial segregation between the processing associated with the avionic domain and performed, i.e. executed, by the at least one primary core; the processing associated with the open domain performed by the secondary core distinct from the at least one primary core; and finally the processing associated with at least one filtering, so as to form the security barrier between the open domain and the avionic domain, performed by the tertiary core distinct from both the secondary core and the at least one primary core.

Preferentially, the calculator according to the invention further provides a temporal segregation between the processing associated with the at least one filtering operation and the other processing, the processing associated with the at least one filtering operation being performed during at least one time zone dedicated to the tertiary core, and the other processing being carried out during one or a plurality of other time zones, distinct from said at least one dedicated time zone.

The skilled person would understand that the terms primary core, secondary core and tertiary core are aimed only at distinguishing the cores from one another within the multicore processor, with regard to the distinct roles, or functions, associated with the different cores. A skilled person would nevertheless notice that such terminology does not entail any relationship of order, importance or priority between the cores. A possible alternative terminology for the cores would be first core, second core, and third core, although appearing to be less appropriate, since the multicore processor is likely to have a plurality of primary cores, i.e. a plurality of first cores.

According to other advantageous aspects of the invention, the avionic calculator comprises one or a plurality of the following features, taken individually or according to all technically possible combinations:

- each filtering is chosen among syntactic filtering and semantic filtering;
- the syntactic filtering preferentially including the verification of at least one syntactic criterion chosen from the group consisting of: the belonging of the sender of the message to a list of authorized senders, the belonging of the recipient of the message to a list of authorized recipients, and the conformity of the message with one of the predefined authorized formats;
- the semantic filtering preferentially including the verification of at least one semantic criterion chosen from the group consisting of: the belonging of one or a plurality of message data to a range of authorized values, the consistency of at least one datum of the message with respect to a predefined reference, and the consistency between at least two data items of the message;
- the tertiary core is further configured for transmitting, after performing the at least one filtering, the message to the respective avionic equipment with a communication protocol different from same associated with the message received from the respective external device;
- the processor is configured for executing one or a plurality of software processes within a predefined time period, the predefined time period being repeated periodically, the predefined time period including a plurality of distinct and successive time zones, and at least one of said time zones being reserved for the execution of software processing(s) by the tertiary core;

The execution of software processing(s) by the at least one primary core and/or the at least one secondary core is preferentially prohibited during the at least one time zone reserved for the execution of software processing(s) by the tertiary core;

- each communication with a respective avionic equipment is carried out by the corresponding primary core according to a respective avionic communication protocol and via a respective primary communication port of the calculator;
- the avionic communication protocol preferentially being chosen from the group consisting of: a protocol as per the standard ARINC 664, such as the standard ARINC 664 Part 3 or the standard ARINC 664 Part 7; a protocol as per the standard ARINC 429; a protocol as per the standard ISO 11898, known as CAN bus, such as the standard ISO 11898-2 or ISO 11898-3; and a protocol as per the standard MIL-STD-1553, such as the standard MIL-STD-1553A or the standard MIL-STD-1553B;
- the calculator further comprises a primary communication peripheral for each respective avionic communication protocol, each primary communication peripheral being connected between the at least one primary core and the respective primary communication port;
- each primary communication peripheral being preferentially controllable via a respective primary device driver, and each primary peripheral driver being executable in user mode or in kernel mode;
- each communication with a respective external electronic device being carried out by the corresponding secondary core according to an external communication protocol and via a respective secondary communication port of the calculator;
- the external communication protocol being preferentially chosen from a protocol as per the Ethernet standard and a protocol as per the standard ARINC 429;
- the calculator further comprising a secondary communication peripheral for each respective external communication protocol, each secondary communication peripheral being connected between the at least one secondary core and the respective secondary communication port;
- each secondary communication peripheral being preferentially controllable via a respective secondary peripheral driver, and each secondary peripheral driver being executable only in user mode;
- the calculator further comprising a primary communication bus linking the at least one primary core to each respective primary communication peripheral, and a secondary communication bus linking the at least one secondary core to each respective secondary communication peripheral, each secondary bus being distinct from each primary bus;
- each secondary communication port being distinct from each primary communication port; and
- the avionic domain being a domain corresponding to the highest security level on-board the aircraft;
- the avionic domain being preferentially the ACD according to the standard ARINC 811 of 20 Dec. 2005.

BRIEF DESCRIPTION OF THE DRAWINGS

The features and advantages of the invention will become clearer upon reading the following description, given only as a non-limiting example, and made with reference to the enclosed drawings, wherein:

FIG. 1 is a schematic representation of a communication system within an aircraft, the communication system comprising an avionic calculator according to a first embodiment of the invention, at least one avionic equipment belonging to an avionic domain and at least one electronic device external to the avionic domain, the avionic calculator being connected between the at least one avionic equipment and the at least one external electronic device and forming a communication gateway there between.

DETAILED DESCRIPTION OF EMBODIMENTS

Figure 1:
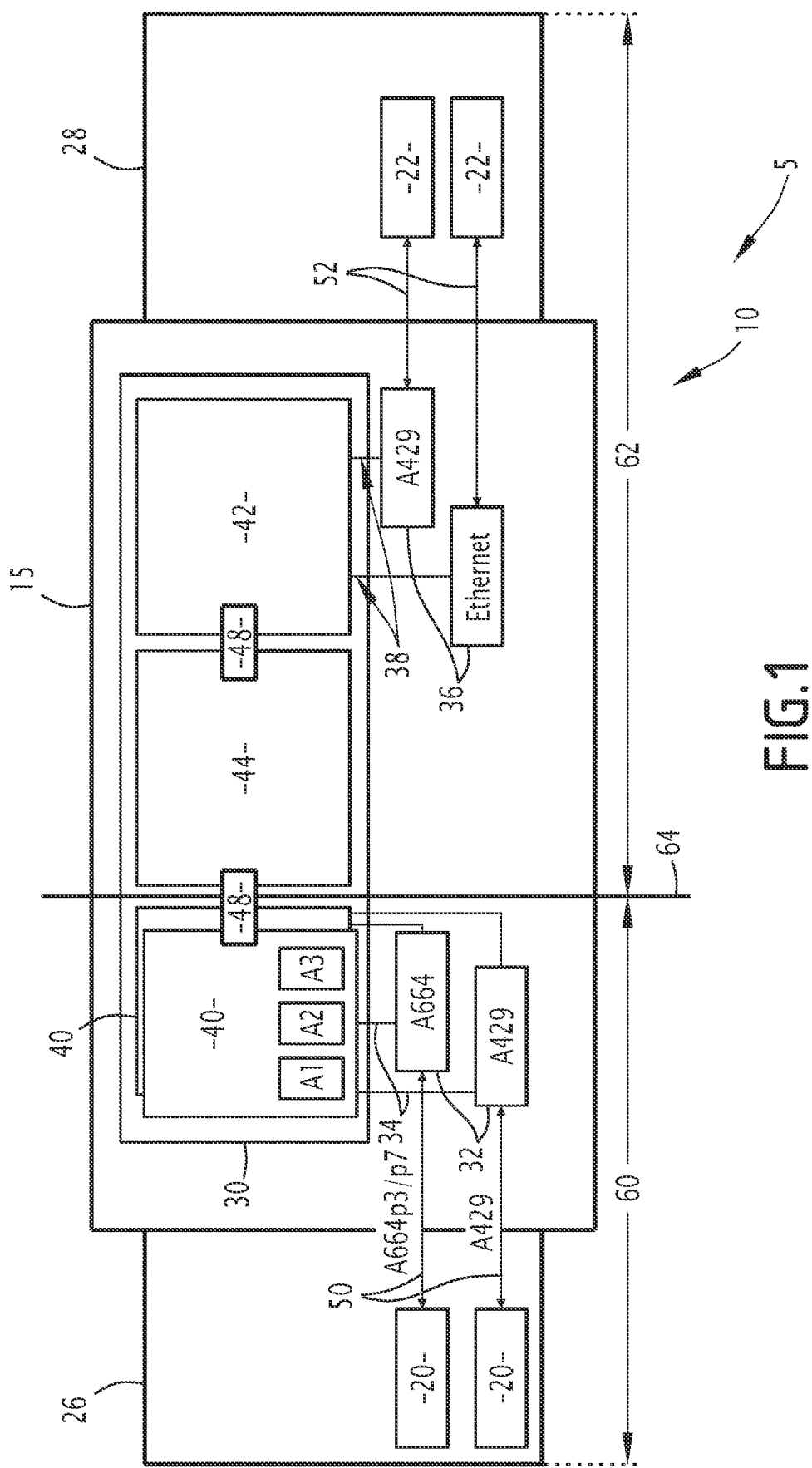

In FIG. 1, an aircraft 5 comprises a communication system 10 including an avionic calculator 15, at least one avionic equipment 20 and at least one device 22 external to an avionic domain 26.

The aircraft 5 is e.g. a plane. In a variant, the aircraft 5 is a helicopter, or a drone which can be remotely piloted by a pilot.

The communication system 10 typically includes a plurality of avionic equipments 20 and/or a plurality of external equipments 22.

The communication system 10 includes the avionic domain 26 and an open domain 28, as shown in FIG. 1.

The avionic domain 26 is a domain corresponding to the highest security level on-board the aircraft 5, more particularly the highest security level required by the communication system 10 of the aircraft 5.

The avionic domain 26 is then a domain for limiting a risk of disturbance—by at least one communication with the at least one electronic device 22 external to the avionic domain 26—of function(s) implemented by the at least one avionic equipment 20 of the avionic domain 26. The avionic domain 26 includes the avionic equipment(s) 20.

The avionic domain 26 is typically the ACD according to the standard ARINC 811 of 20 Dec. 2005.

The open domain 28 is a domain to which corresponds a lower security level than the security level of the avionic domain 26. The open domain 28 includes the external device(s) 22.

The avionic calculator 15 is connected to each avionic equipment 20 and to each external device 22 of the communication system 10, and then forms a communication gateway between each avionic equipment 20 and each external device 22.

Figure 2:
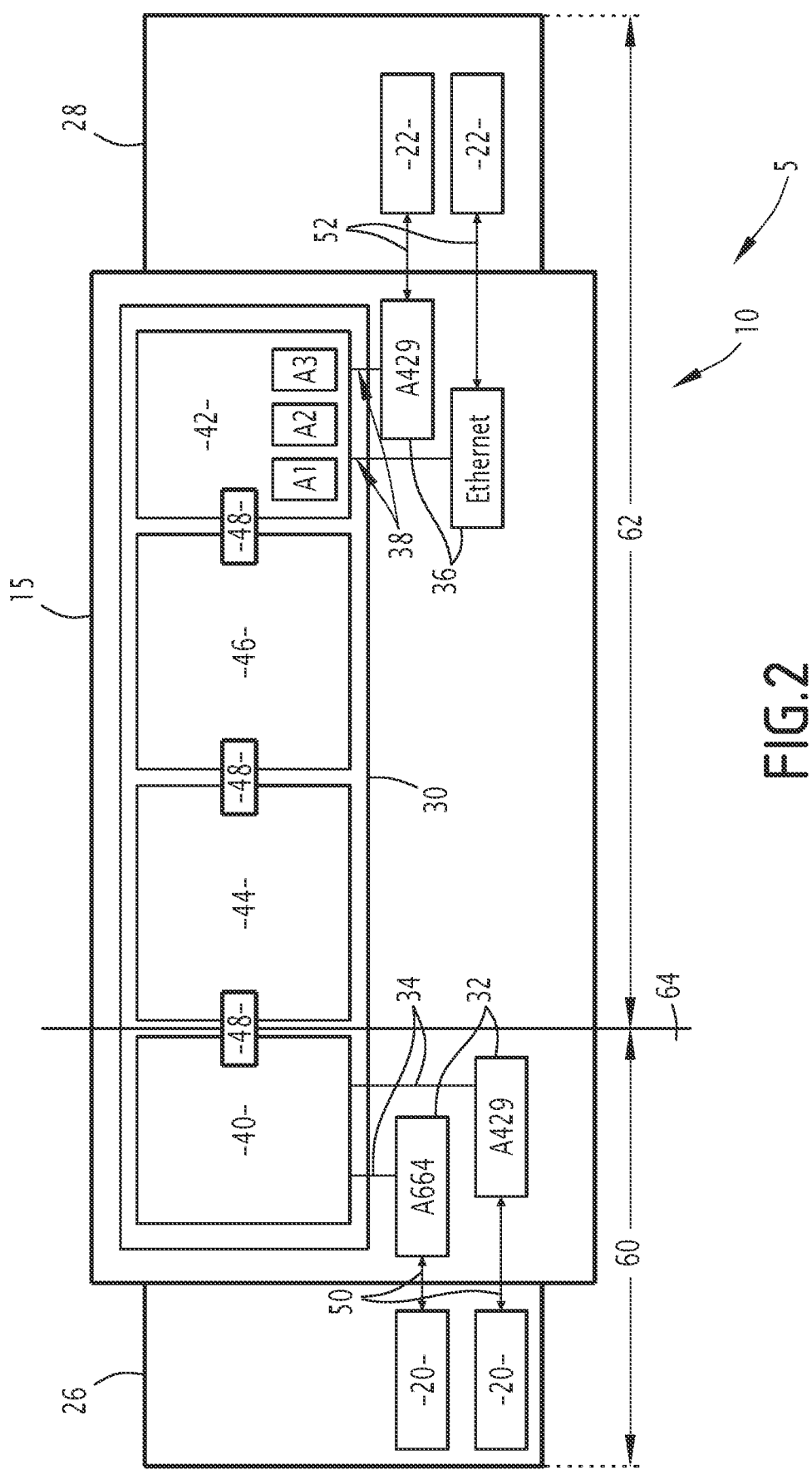
FIG. 2 is a view similar to the view shown in FIG. 1, according to a second embodiment of the invention.

In the examples shown in FIGS. 1 and 2, the avionic calculator is on-board the aircraft 5, and comprises a multicore processor 30 configured for executing one or a plurality of avionic software applications A1, A2, A3.

The avionic calculator 15 is configured for communicating with each avionic equipment 20 according to a respective avionic communication protocol.

The avionic communication protocol is e.g. chosen from the group consisting of: a protocol as per the standard ARINC 664, such as the standard ARINC 664 Part 3 or the standard ARINC 664 Part 7; a protocol as per the standard ARINC 429; a protocol as per the standard ISO 11898, known as CAN bus, such as the standard ISO 11898-2 or ISO 11898-3. a protocol as per the standard MIL-STD-1553, such as the standard MIL-STD-1553A or the standard MIL-STD-1553B.

In addition, the avionic calculator 15 further comprises a primary communication peripheral 32 for each respective avionic communication protocol. According to such addition, the avionic calculator 15 typically comprises a primary communication bus 34 linking the processor 30 to each respective primary communication peripheral 32.

The avionic calculator 15 is configured for communicating with each external electronic device 22 according to a respective external communication protocol.

The external communication protocol is e.g. a protocol as per the Ethernet standard or a protocol as per the ARINC 429 standard.

In addition, the avionic calculator 15 further comprises a secondary communication peripheral 36 for each respective external communication protocol. According to such supplement, the avionic calculator 15 typically comprises a secondary communication bus 38 linking the processor 30 to each respective secondary communication peripheral 36, each secondary bus 38 being distinct from each primary bus 34.

Each avionic equipment 20 is carried on-board the aircraft 5 and belongs to the avionic domain 26. Each avionic equipment 20 is known per se and is configured for implementing one or a plurality of respective avionic functions.

Each avionic equipment 20 is e.g. chosen from the group consisting of: a Flight Management System (FMS) of the aircraft; a Flight Guidance (FG) system; a Flight Control System (FCS); a satellite positioning system, such as a GPS (Global Positioning System); an IRS (Inertial Reference System); an ILS (Instrument Landing System) or an MLS (Microwave Landing System); a ROPS (Runway Overrun Prevention System); and an RA denoted RA (RadioAltimeter).

Each external device 22 belongs to the open domain 28, and is carried on-board the aircraft 5, or else is installed on the ground. As an example, the external aircraft 22 is an aircraft implementing functions relating to the airline operating the aircraft, such as a CMS (Centralized Maintenance System); or a passenger cabin management system. As a further example, the external device 22 is an electronic device with a flight management function, e.g. a non-avionic on-board tablet, i.e. a non-certified on-board tablet, such as an EFB (Electronic Flight Bag).

The processor 30 includes at least one primary core 40 configured for communicating with at least one avionic equipment 20 distinct from the calculator 15; at least one secondary core 42 configured for communicating with at least one electronic device 22 external to the avionic domain 26 and a tertiary core 44 configured for performing at least one filtering of a data message received from a respective device 22 external to the avionic domain 26 and intended for a respective avionic equipment 20 of the avionic domain 26. The at least one secondary core 42 is distinct from the at least one primary core 40, and the tertiary core 44 is distinct from the at least one primary core 40 and from the at least one secondary core 42.

In the example shown in FIG. 2, the processor 30 further includes an additional core 46.

In the examples shown in FIGS. 1 and 2, the processor 30 includes four cores. More precisely, in the example shown in FIG. 1, the processor 30 includes two primary cores 40, a secondary core 42 and a tertiary core 44. In the example shown in FIG. 2, the processor 30 includes a primary core 40, a secondary core 42, a tertiary core 44 and an additional core 46.

In a variant, the processor 30 includes more than four cores, and then typically includes a plurality of additional cores 46 and/or a plurality of primary cores 40 and/or secondary cores 42.

The processor 30 advantageously includes a single tertiary core 44.

The communication between the cores 40, 42, 44, 46 of the processor 30 is typically performed via internal ports 48, included in the processor 30.

Advantageously, each primary core 40 is in relation with the avionic domain 26 and communicates only with the tertiary core 44 via a respective internal port 48.

The tertiary core 44 forms a filter between the open domain 28 and the avionic domain 26, and then communicates with each primary core 40 and with at least one secondary core 42 and/or an additional core 46, such inter-core communications taking place via respective internal ports 48.

As an optional addition, at least one secondary core 42 is configured for implementing a firewall, in order to perform a preliminary filtering of the messages received from each external device 22.

In the example shown in FIG. 1, the two primary cores 40 are in communication only with the tertiary core 44, and not with the secondary core 42. In a reciprocated way, the secondary core 42 communicates only with the tertiary core 44, and not with the primary cores 40.

In the example shown in FIG. 2, the primary core 40 communicates only with the tertiary core 44, and the tertiary core 44 communicates with the secondary core 42 indirectly via the additional core 46. According to the above example, the additional core 46 is then, in terms of communication, arranged between the tertiary core 44 and the secondary core 42.

Each communication of the avionic calculator 15 with a respective avionic equipment 20 is performed by the corresponding primary core 40 according to a respective avionic communication protocol and via a respective primary communication port 50 of the calculator 15.

Each communication of the avionic calculator 15 with a respective external electronic device 22 is performed by the corresponding secondary core 42 according to an external communication protocol and via a respective secondary communication port 52 of the calculator 15. Each secondary communication port 52 is advantageously distinct from each primary communication port 50.

A skilled person would then understand that the avionic domain 26 including each avionic equipment 20, each primary peripheral 32, each primary bus 34, each primary core 40 and each primary port 50 belong to a trusted zone 60; and that the open domain 28 including each external device 22, each secondary peripheral 36, each secondary bus 38, each secondary core 42, the tertiary core 44, and, where appropriate, each complementary additional core 46, as well as each secondary port 52, belonging to an exposed zone 62; a boundary 64 between the trusted zone 60 and the exposed zone 62 then corresponding to the communication interface between the primary core or cores 40 and the tertiary core 44, as shown in FIGS. 1 and 2.

Each avionic software application A1, A2, A3 is executable by a respective core chosen among at least one primary core 40 and at least one secondary core 42.

In the example shown in FIG. 1, the avionic software applications A1, A2, A3 are executed by the at least one primary core 40.

In the example shown in FIG. 2, the avionic software applications A1, A2, A3 are executed by the secondary core 42.

In a variant, not shown, certain avionic software application(s) A1, A2 are executed by the at least one primary core 40, while other avionic software application(s) A3 are executed by the at least one secondary core 42.

The distribution, between the at least one primary core 40 and the at least one secondary core 42, of the execution of the avionic software applications A1, A2, A3 is advantageously carried out by type of software application. As an example, the or each primary core 40 is configured for executing communication applications, such as ACARS (Aircraft Communication Addressing and Reporting System) applications, e.g. ATC (Air Traffic Control) communication applications, AOC (Air Operational Control) communication applications, and AAC (Airline Administrative Control) communication applications. As yet another example, the or each secondary core 42 is configured for executing calculator equipment management applications, such as a printer management application, an application for managing certain functions of an external communication server.

In an optional addition, the processor 30 is configured for executing one or a plurality of software processing within a predefined time period, the predefined time period being periodically repeated.

The predefined time period advantageously includes a plurality of distinct and successive time zones, and at least one of said time zones is reserved for the execution of software processing by the tertiary core 44. The fact that at least one of said time zones is dedicated to the tertiary core 44 is used for improving the performance of the avionic calculator 15.

In addition again, the execution of software processing by the at least one primary core 40 and/or the at least one secondary core 42 is preferentially prohibited during the at least one time zone reserved for the execution of software processing by the tertiary core 44.

Each respective message filtering performed by the tertiary core 44 is typically a syntactic filtering or a semantic filtering.

The syntactic filtering, also called syntax filtering, advantageously includes the verification of at least one syntactic criterion, also called syntax criterion, chosen from the group consisting of: the belonging of the sender of the message to a list of authorized senders, the belonging of the recipient of the message to a list of authorized recipients, and the conformity of the message with one of the predefined authorized formats.

The semantic filtering advantageously includes the verification of at least one semantic criterion chosen from the group consisting of: the belonging of one or a plurality of message data to a range of authorized values, the consistency of at least one datum of the message with respect to a predefined reference, and the consistency between at least two data items of the message.

With such filtering of messages, the tertiary core 44 fulfills a cyber security function, also called cyber processing core.

The tertiary core 44 is further configured for transmitting, after performing the at least one filtering, the message to the respective avionic equipment 20 with a communication protocol different from same associated with the message received from the respective external device 22.

Each primary communication peripheral 32 is connected between the at least one primary core 40 and the respective primary communication port 50. Each primary communication peripheral 32 is advantageously controllable via a respective primary peripheral driver, and each primary peripheral driver is executable in user mode or in kernel mode (or kernel OS mode).

Each primary communication bus 34 links the at least one primary core 40 to at least one respective primary communication peripheral 32.

In the examples shown in FIGS. 1 and 2, the avionic calculator includes two primary peripherals 32, one as per the standard ARINC 664, denoted by A664, such as the standard ARINC 664 Part 3, denoted by A664p3, or the standard ARINC 664 Part 7, denoted by A664p7; the other being as per the standard ARINC 429, denoted by A429.

Each secondary communication peripheral 36 is connected between the at least one secondary core 42 and the respective secondary communication port 52. Each secondary communication peripheral 36 is advantageously controllable via a respective secondary peripheral driver, and each secondary peripheral driver is executable only in user mode.

Each secondary communication bus 38 links the at least one secondary core 42 to at least one respective secondary communication peripheral 36.

In the examples shown in FIGS. 1 and 2, the calculator 15 includes two secondary peripherals 36, one being as per the standard ARINC 429, denoted by A429; the other being as per the Ethernet standard.

Thereby, the avionic calculator 15 according to the invention makes it possible to host in a modular manner, a cyber security function via the tertiary core 44 and another function for executing avionic software applications A1, A2, A3 via the at least one respective core selected from the at least one primary core 40 and the at least one secondary core 42. In a context of modularity, also called IMA (Integrated Module Avionics), the avionic calculator 15 according to the invention then makes it possible to use the same equipment for another function or on a new aircraft while guaranteeing, with requirements for implementing the applications, the independence and the non-disruption of applications between each other. In addition, the architecture and the IMA provides incremental certification, which means that an evolution of an application, according to the implementation requirements, does not jeopardize the certification of the calculator/applications unit.

The avionic calculator 15 according to the invention can then be used for hosting one or a plurality of functions of the avionic domain 26, such as one or a plurality of functions of the ACD, and a cyber function by means of the syntactic and/or the semantic filtering providing protection against attacks from the open domain 28.

Only the or each secondary core 42 is in direct relation with the open domain 28 (the domain from which attacks can come) and has access to the secondary peripheral(s) 36 exposed to the open domain 28. Each secondary core 42 is then also called exposed core.

Each secondary peripheral driver 36 is preferentially executed in user mode, so as to limit the impact of a vulnerability of the driver and not to impact the kernel of the avionic calculator 15.

The tertiary core 44, called "cyber processing" core, has no direct access to one of the secondary peripherals 36 receiving data from the open domain 28, and also no direct access to primary peripherals 32 of the avionic domain 26, so as to avoid short-circuiting of cyber processing between the open domain 28 and the avionic domain 26. The filtering function implemented by the tertiary core 44 is aimed at ensuring that each flow transmitted to the avionic domain 26 is conforming to an uncompromised aeronautical stream.

Thereby, before passing into the trusted zone 60 including the avionic domain 26, a stream coming from the open domain 28 has to pass through the two cores, namely the secondary core 42 called exposed core, then the tertiary core 44 called cyber processing core.

The performance of the avionic calculator 15 is ensured by secondary 42 and tertiary 44 cores allocated statically and with dedicated time zones during each predefined time period. The other cores, in particular the primary core or cores 40, are advantageously dedicated to applicative applications in an IMA system.

Starting from an aeronautical function, whether or not previously hosted in an IMA calculator, the avionic calculator 15 according to the invention with the multicore processor 30 thereof, where two cores 42, 44 are associated with cyber security and the other cores can be used for hosting the initial aeronautical function, is thus used for adding a cyber security function to the initial aeronautical function, without adding a calculator or electronic board.

It will thus be understood that the avionic calculator 15 according to the invention can be used for responding more effectively to the need for a security gateway between the open domain 28 and the avionic domain 26.

The invention claimed is:

1. An avionic calculator carried on-board an aircraft, the calculator comprising a multi-core processor configured for executing one or a plurality of avionic software applications, the processor comprising:
at least one primary core configured for communicating with at least one avionic equipment distinct from the calculator, the or each avionic equipment being on-board the aircraft and belonging to an avionic domain;
at least one secondary core configured for communicating with at least one electronic device external to the avionic domain, the at least one secondary core being distinct from said at least one primary core; and
a tertiary core configured for performing at least one filtering of a data message received from a respective device external to the avionic domain and intended for a respective avionic equipment of the avionic domain, the tertiary core being distinct from said at least one primary core and from said at least one secondary core,
each avionic software application being executable by a respective core chosen among said at least one primary core and said at least one secondary core.

2. The calculator according to claim 1, wherein each filtering is selected among a syntactic filtering and a semantic filtering.

3. The calculator according to claim 2, wherein the syntactic filtering includes verification of at least one syntactic criterion chosen from the group consisting of: the belonging of the sender of the message to a list of authorized senders, the belonging of the recipient of the message to a list of authorized recipients, and the conformity of the message with one of predefined authorized formats.

4. The calculator according to claim 2, wherein the semantic filtering includes verification of at least one semantic criterion chosen from the group consisting of: the belonging of one or a plurality of message data to a range of authorized values, the consistency of at least one datum of the message with respect to a predefined reference, and the consistency between at least two data items of the message.

5. The calculator according to claim 1, wherein the tertiary core is further configured for transmitting, after performing the at least one filtering, the message to the respective avionic equipment with a communication protocol different from the one associated with the message received from the respective external device.

6. The calculator according to claim 1, wherein said processor is configured for executing one or a plurality of software processes within a predefined time period, the predefined time period being repeated periodically, the predefined time period including a plurality of distinct and successive time zones, and at least one of said time zones being reserved for execution of software processing by said tertiary core.

7. The calculator according to claim 6, wherein execution of software processing by said at least one primary core and said at least one secondary core is prevented during the at least one time zone reserved for the execution of software processing by said tertiary core.

8. The calculator according to claim 1, wherein each communication with a respective avionic equipment is performed by the corresponding primary core according to a respective avionic communication protocol and via a respective primary communication port of the calculator.

9. The calculator according to claim 8, wherein the avionic communication protocol is chosen from the group consisting of: a protocol as per the standard ARINC 664; a protocol as per the standard ARINC 429; a protocol as per the standard ISO 11898, and a protocol as per the standard MIL-STD-1553.

10. The calculator according to claim 8, further comprising a primary communication peripheral for each respective avionic communication protocol, each primary communication peripheral being connected between said at least one primary core and the respective primary communication port.

11. The calculator according to claim 10, wherein each primary communication peripheral is controllable via a respective primary device driver, and wherein each primary device driver is executable in user mode or in kernel mode.

12. The calculator according to claim 10, wherein the calculator further comprises:
 a secondary communication peripheral for each respective external communication protocol, each secondary communication peripheral being connected between said at least one secondary core and the respective secondary communication port;
 a primary communication bus linking said at least one primary core to each respective primary communication peripheral; and
 a secondary communication bus linking said at least one secondary core to each respective secondary communication peripheral, each secondary bus being distinct from each primary bus.

13. The calculator according to claim 10, further comprising a secondary communication peripheral for each respective external communication protocol, each secondary communication peripheral being connected between the at least one secondary core and the respective secondary communication port, and wherein each secondary communication port is distinct from each primary communication port.

14. The calculator according to claim 1, wherein each communication with a respective external electronic device is performed by the corresponding secondary core according to an external communication protocol and via a respective secondary communication port of the calculator.

15. The calculator according to claim 14, wherein the external communication protocol is chosen from a protocol as per the Ethernet standard and a protocol as per the standard ARINC 429.

16. The calculator according to claim 14, further comprising a secondary communication peripheral for each respective external communication protocol, each secondary communication peripheral being connected between said at least one secondary core and the respective secondary communication port.

17. The calculator according to claim 16, wherein each secondary communication peripheral is controllable via a respective secondary device driver, and each secondary device driver is executable only in user mode.

18. The calculator according to claim 1, wherein the avionic domain is a domain corresponding to a highest security level on-board the aircraft.

19. The calculator according to claim 18, wherein the avionic domain is the ACD as per the standard ARINC 811 of 20 Dec. 2005.

* * * * *